United States Patent [19]
Klausz

[11] Patent Number: 4,578,752
[45] Date of Patent: Mar. 25, 1986

[54] TOMODENSITOMETER FOR IMAGE DISPLAY IN THE DYNAMIC MODE

[75] Inventor: Rémy Klausz, Paris, France

[73] Assignee: Thomson CSF, Paris, France

[21] Appl. No.: 451,797

[22] Filed: Dec. 21, 1982

[30] Foreign Application Priority Data

Dec. 31, 1981 [FR] France ................................ 81 24573

[51] Int. Cl.⁴ ............................................. G06F 15/42
[52] U.S. Cl. ...................................... 364/414; 378/14; 378/901
[58] Field of Search .................... 364/414, 415; 378/4, 378/14, 21, 901, 15, 23; 358/111, 903

[56] References Cited

U.S. PATENT DOCUMENTS

| | | | |
|---|---|---|---|
| 4,182,311 | 1/1980 | Seppi et al. | 364/414 |
| 4,191,892 | 3/1980 | Huang et al. | 378/901 |
| 4,293,912 | 10/1981 | Walters | 364/414 |
| 4,295,195 | 10/1981 | Hounsfield | 364/414 |
| 4,520,442 | 5/1985 | Grimberg et al. | 364/414 |

Primary Examiner—Gary V. Harkcom
Attorney, Agent, or Firm—Cushman, Darby & Cushman

[57] ABSTRACT

A process for tomodensitometric image display in the dynamic mode, and a tomodensitometer utilizing the process in medical radiology. The invention relates to a process and to a tomodensitometer for the real-time and simultaneous generation of several images at instants close to each other of one and the same plane cross-section of a body under examination. After appropriate processing, each projection obtained from a source of radiation passing through the plane cross-section to a receiver is fed to a calculator of the contributions of the projection at a given point of the cross-section. The contribution is supplied to a multiplexer which feeds the same to accumulator memories, each being allocated to an image of the cross-section at a given instant.

6 Claims, 3 Drawing Figures

TOMODENSITOMETER FOR IMAGE DISPLAY IN THE DYNAMIC MODE

The present invention relates to a process for tomodensitometric image display in the dynamic mode. It also relates to a tomodensitometer utilizing a process of this nature. The invention finds application in radiodiagnostics and in particular in medical image display by means of X-rays. Dynamic mode is a working mode which permits realization of as many tomodensitometric images as possible during periods as short and near one another as possible in relation with a same cross-section plane. This working mode permits, in particular, the following in time of the evolution of a natural or aroused phenomenon such as for example opacification of a blood vessel by a contrast medium.

BACKGROUND OF THE INVENTION

Tomodensitometry is a technique which renders it possible to obtain images of the inside of the human body by means of electromagnetic radiation transmitted through a plane section of the body examined. In effect, a densitometer comprises three principal parts:
- a stand which surrounds the section which is to be depicted, and which carries means of obtaining tomodensitometric data and driving means for causing the data acquisition means to revolve around the section,
- a system for processing tomodensitometric data to convert the data into exploitable image data,
- a display unit which may for example comprise a graphic computer for image processing and a storage system.

The acquisition of densitometric data is performed at each rotation of the detection means in order to obtain a projection of the section in a given angular direction. A set of projections is obtained by means of successive rotations. The tomodensitometric data consist in the totality of the values of the projections. It is known that it is sufficient to be conversant with the totality of these projections to establish the value of the image projected, at any point. The image values are deducted from the projection values by means of a calculation in accordance with a known algorithm.

One particular design of tomodensitometer is a tomodensitometer comprising multidetectors and a source which are rotated in combination. In the case of X-rays, a source of X-ray transmits a fan-shaped beam which is intercepted by the section examined and then by a multidetector receiver which intercepts the beam as a whole. The source and receiver are fixed on a stand. Each projection thus comprises, for an angular position, the values of the measurements taken at each of the detectors of the receiver. Then, during a rotation through an angle of at least half a revolution plus the aperture of the fan-shaped beam, a theoretically sufficient coverage is obtained of the section as a whole.

A special processing operation on each projection is required to calculate the image density value at each image point ("pixel" or image element). In a particular processing example, as is known in the prior art, this processing operation comprises a linear straightening and an expansion, this latter operation corresponding to a calculation of the contributions of each projection at each image element, then to an accumulation of the contributions at each dot.

An image is available in digital form at the end of the reconstruction process; the display assembly enables making the image available to the user under visual form. Data means enable moreover image processing to be effected.

These various operations are effected at very high speed. However, one element bridles considerably the speed of acquisition of an image. In effect, the acquisition of tomodensitometric data is mechanical at the level of its collection. The periods of acquisition are therefore comparatively long. In particular, they do not permit images to be produced in the dynamic mode, that is to say sufficiently frequent to provide overall information free of interference by organs in motion or else useful information on the displacements themselves.

Partial solutions consist in reducing the periods of acquisition by reducing the amplitude of the rotations. For example, it has been proposed to couple several sources distributed uniformly on the circular stand. The gap between two sources is occupied by a receiver. A rotation having a smaller amplitude than the angle at the centre separating two sources, is sufficient. Since this angle may be limited to a few degrees, the rotation is very small and the period of acquisition very short.

A solution of this kind causes a considerable increase in the quantity of equipment however. The cost of the apparatus and of its maintenance, as well as the complication of its control system, are increased.

Another solution consists in decomposing a set of projections taken over a total angle exceeding the minimum required into several sets of projections comprising common elements, each corresponding to the minimum angular amplitude. The solution is advantageous with machines revolving continuously.

When the projection data have been acquired over almost a whole revolution, it is apparent that several different images of the same section may be reconstructed at different dates by regrouping a sufficient number of projections for each image. The period which separates two images is at least equal to the period of a rotation of the acquisition array from the position of acquisition of the first projection of the first image to the position of acquisition of the first projection of the second image.

It is thus possible to obtain two images of a phenomenon which are very close to each other in time (at best of the order of 10 ms). However, in the prior art, what is required for application of this process are either calculation means for each image for a reconstruction in real time, or else storage of all the projections and subsequent and successive processing of each image.

The first solution initially implies an increase in the number of processing systems, one only being allocated to each image, which is not actually practicable for economic reasons.

The second solution necessitates the availability of a high storage capacity for the projections and supplies the images in delayed time only. On the other hand, it imposes interruption of the acquisition once the last image of the variable phenomenon has been acquired. This is disadvantageous in the case of a tomodensitometer which operates without interruption and which successively establishes several sections.

SUMMARY OF THE INVENTION

The present invention makes it possible to avoid these disadvantages of the prior art. In effect, it relates to a process for tomodensitometric display in the dynamic mode, which includes the acquisition of projections of the section which is to be imaged over a greater angular distance than the minimum value required for reconstruction of an image and in regrouping these latter into as many sub assemblies as the number of images it is wished to obtain of the same section at predetermined instants, each sub assembly comprising a sufficient number of projections to reconstruct an appropriate image. The process of the invention is principally characterized in that each projection is dealt with independently of the images to which it is allocated, but that its contribution to each of these images is accumulated in an image memory specially set aside for each image of the section examined.

The invention also relates to a tomodensitometer utilizing such a process. A tomodensitometer according to the invention comprises an assembly for acquiring projections of known kind and in a greater number than that required to perform reconstruction of an image of the plane section which is to be examined, and a processor for processing the projections. The invention is however principally characterized by the fact that each projection relative to an angular position is submitted first to all the processing operations enabling to determine its contribution to any image correlated to the period of time to which it appertains, the result of these processing operations forming a set of values due to be accumulated at each point of every image, these values are fed via a multiplexer to a predetermined number of independent accumulator memories, each memory containing one image of the section during one of the periods of time including the instant of measurement of the projection.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
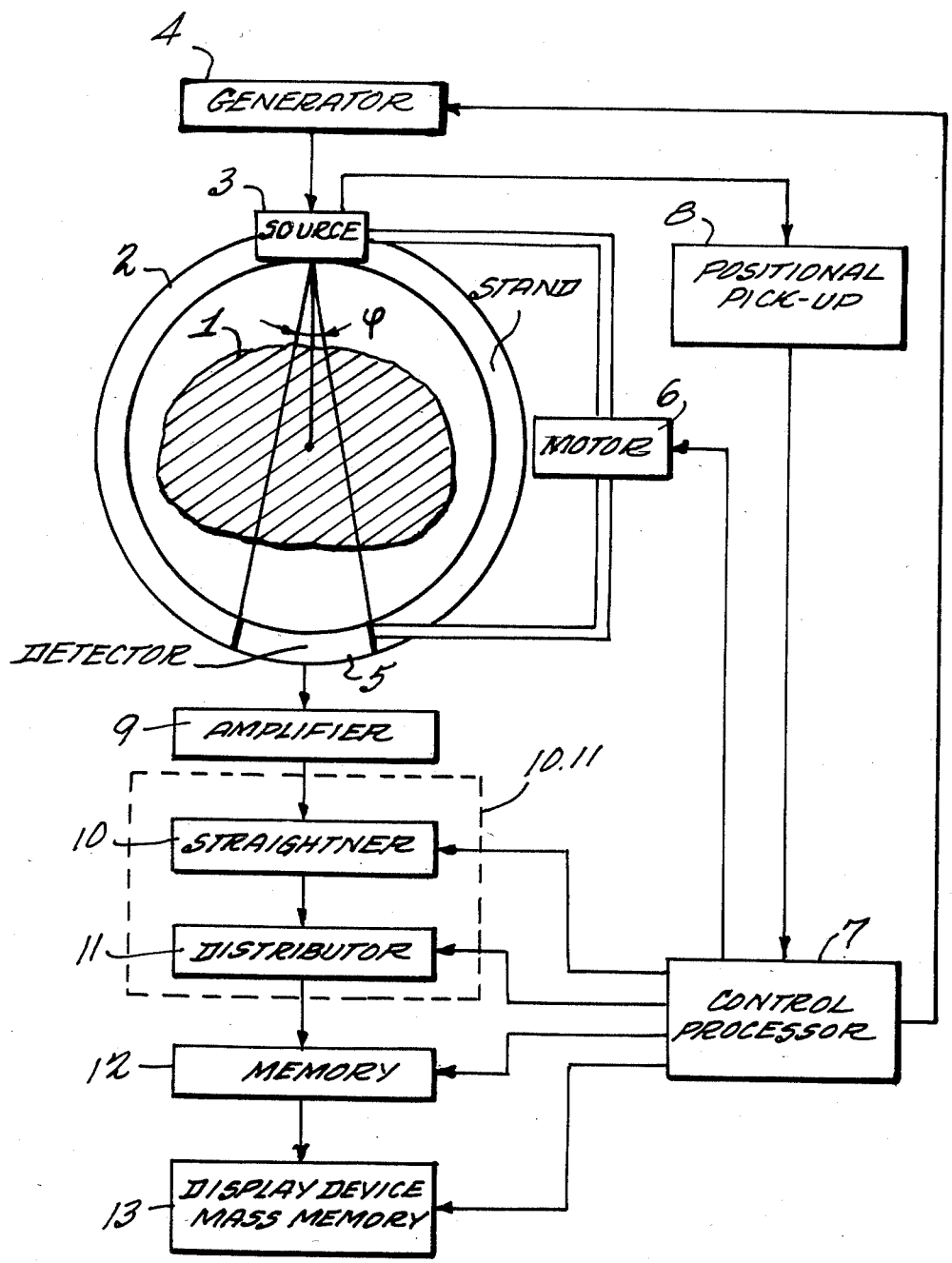
FIG. 1 is a basic layout diagram of a tomodensitometer having a fan-shaped beam.

A conventional type of tomodensitometer has been illustrated in FIG. 1. The body 1 to be imaged in section, has been placed within a stand or holder 2. A source 3 and a detector 5 are movable in rotation on the holder. The source may be a source of the X-ray tube type, or a source collimated into plane limited to a fan shape. It is supplied by means of a programmable high tension generator 4. The detector 5 makes it possible to obtain a projection of the cross-section which is to be imaged or depicted. If the detector 5 comprises a plurality of elementary detectors, each detector makes it possible to acquire projection data in the direction of the radius of the fan-shaped beam which is picked up by the detector. If the detector comprises 256 detectors, the projection obtained comprises 256 data items acquired along 256 directions contained in the fan-shaped beam. A motor 6 drives the source and the detector in rotation in interlinked manner so that this source and receiver remain diametrically opposite on the holder. The signals provided by the receiver 5, which are the tomodensitometric projection data, are fed to an amplifier and shaper circuit 9. The signals are then fed into an image reconstruction processor 10.11 which for example, comprises a straightener 10 and a distributor 11. After straightening, the straightened projections are fed to the distributor which makes it possible to accumulate within the memory 12 and at each image location, the absorption value corresponding to the location addressed. The contents of the memory may be exhibited on a display device 13.

Figure 2:
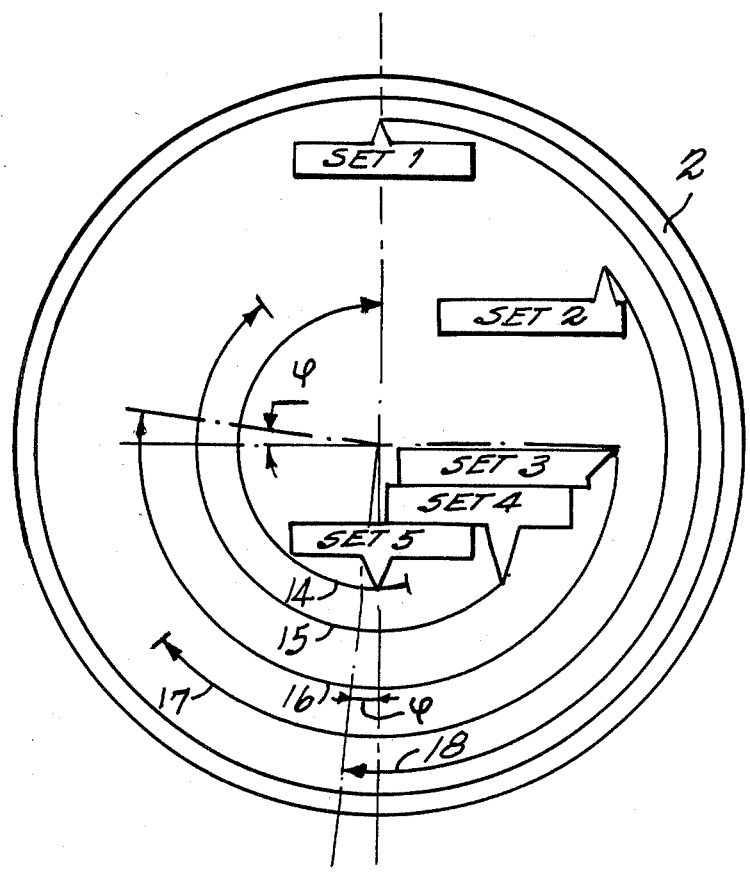
FIG. 2 is a grouping of projection data into a plurality of sets for the purpose of reconstructing a plurality of images in the dynamic mode.

At the time of each acquisition, the positional pick up 8 measures the position of the source 3. The position data is fed to a control processor 7 which delivers a control signal to the motor 6 on the one hand and to the image reconstruction processor 10.11 on the other hand. In a device of this nature, acquisition of the data necessary for reconstruction of an image is performed during a period which is too long to be compatible with the phenomenon which is to be depicted. To allow this analysis, it has been proposed to combine the projections into a set of data over at least 180°. An embodiment of this kind is illustrated in FIG. 2, in which the holder 2 has been shown. Five sets 14 to 18 of projections are illustrated to depict the successive acquisition of five images along a complete cycle of rotation of the source 3-receiver 5 assembly. In the case of a device of this kind, once the tomodensitometric acquisition cycle has been initiated, the projection data are detected and processed over at least half a revolution in accordance with the theory. In the case of a tomodensitometer having a fan-shaped beam, this angular distance should be increased by the aperture $\phi$ of the fan-shaped beam.

In order to permit the acquisition of several images successively, it has consequently been proposed that the tomodensitometric projections be divided into a plurality of sets of projections over a complete revolution for acquisition, each set being formed by the data obtained for the angle 180° increased by the angle of aperture of the beam. Each set renders it possible to reconstruct one image. Over a 10 second cycle, it is thus possible to synchronize the examination of a 2-second action in 2 seconds with five sets of projections.

Figure 3:
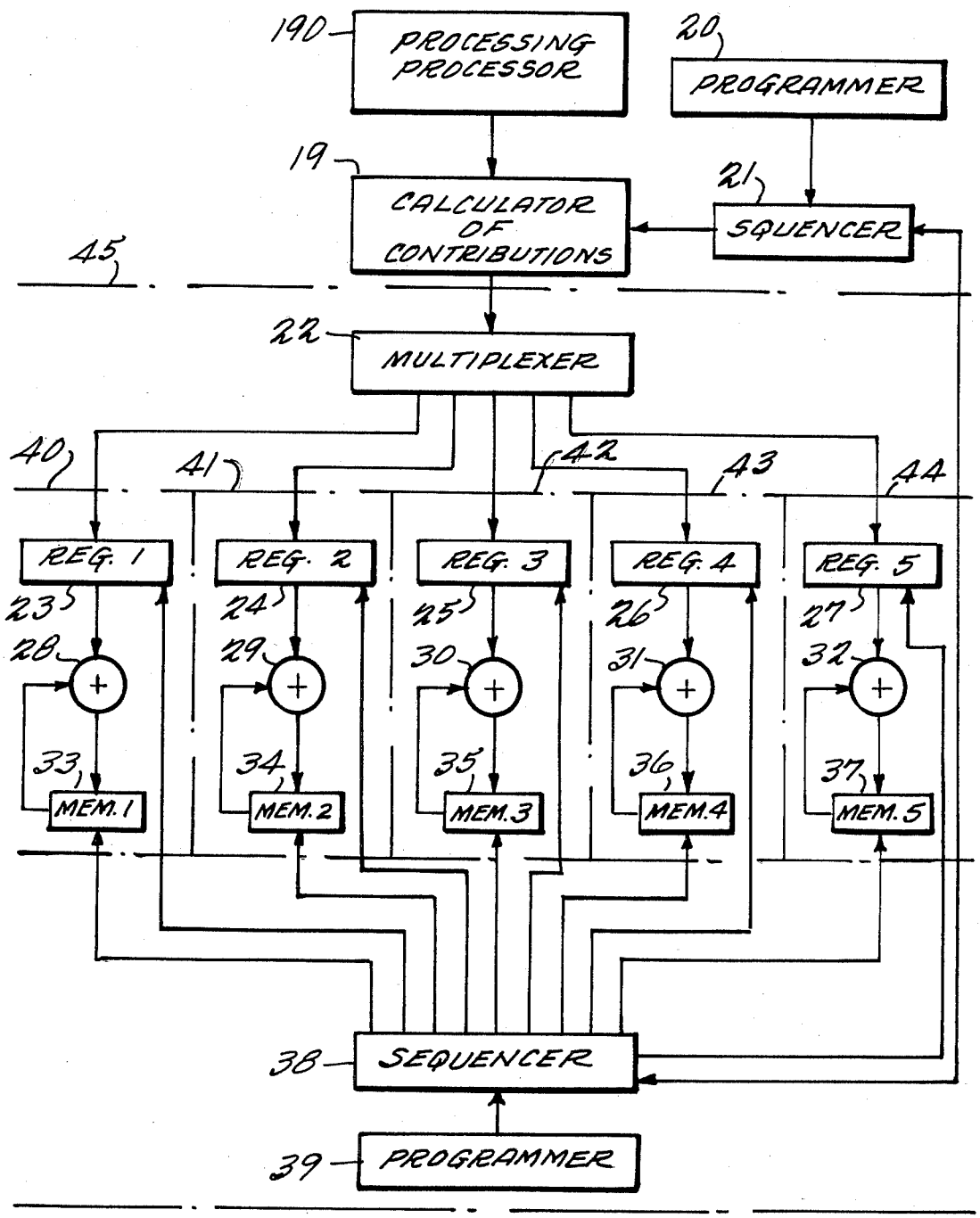
FIG. 3 is a diagram of one embodiment of a processor according to the invention.

According to a preferred embodiment of the invention as illustrated in FIG. 3, a solution has been proposed which avoids increasing the calculation means.

In U.S. Pat. No. 4,520,442, a particular accumulator memory has been proposed. In this application, the accumulator memory also comprises a processing unit or delocalized operator of the processing processor. In an algorithm utilizing straightening and distribution, this operator is preferably a summator. During the distributing action, the straightened projections are allocated to each location addressed in the image. The contributions computed from these straightened projections, are accumulated directly in the image memory in such a manner as to avoid occupation of the verification element of the central processor during the accumulation operations. It has also been proposed in this application to organize the memory into a particular number of sections or pages, each section comprising its own verifier element and its own processing element.

In the present invention, the different memory sections are equipped with a summator and operate under the control of a sequencer and a programmer which makes it possible to establish the reconstructions of each image in the dynamic mode.

Each memory section may act as an accumulator memory within a tomodensitometer of the invention. It is then allotted to a set of well defined N projections amongst the M projections obtained during a working cycle of the machine.

In FIG. 3, the straightened projections at the output of the processing processor 190 straightener are fed to a contribution calculator 19. Under the control of a sequencer 21 actuated by a programmer 20, the contributions are fed to the memory 45. In the case of the invention, the latter comprises several accumulator memories 40-44. Each accumulator memory comprises a read-write memory 33-37, a summator 28-32 and an input register 23-27, respectively. The memory 45 also comprises a multiplexer 22. When the sequencer 21 authorizes the calculator 19 to transmit a contribution corresponding to a positional location (x,y) of the section, this contribution is fed by the multiplexer 22 to each of the input registers 23-27 of each accumulators memory 40-44. Since each accumulator memory is allocated to an image corresponding to a well defined set of N projections, the contribution deriving from one projection only concerns particular accumulator memories. The memory 45 also comprises a sequencer 38 synchronized with sequencer 21 which, under verification by a programmer 39, selects the accumulator memories affected by the contribution transmitted by the calculator 19 and the address of each of their read-write memories 33-37 corresponding to the position (x,y) of the point of the cross-section at which the contribution had been calculated.

The process of the invention is very satisfactory in the case of a tomodensitometer utilizing continous rotation. For example, it is possible to allocate a complete cycle to each section. As stated, each image is obtained over approximately half a revolution. Before being recharged, each memory may consequently be read and reset to zero. To this end, it is sufficient for the overlaps to leave enough time for a memory to be read and reset to zero. It is then possible either to restart a cycle for obtaining images of the same section, or also to displace the apparatus to obtain another cross-section.

FIGS. 2 and 3 will now be referred to in combination so as to explain the operation of the tomodensitometer of the invention at a given instant. When in FIG. 2, a position is adopted in which the acquisition device is placed in such a manner that the receiver is placed at the right-hand side of the horizontal diameter, it is observed that three images have been programmed. These are the images corresponding to the set 1 of projections, to the set 2 of projections and to the set 3 of projections. When a projection is detected, it will have to be allocated to the memory 1-33, the memory 2-34 and the memory 3-35. To this end, the multiplexer provides each register 23 to 25 with the precise contribution of this projection after straightening following the points forming the image. When a fourth and fifth image are desired, the multiplexer can provide the appropriate information to registers 26 and 27. Each point is contained in a cell of each of the image memories. The sequencer 38 then transmits the order to the register 1-23, to the register 2-24 and to the register 3-25 to supply the contribution common to the three images associated with the sets 1,2 and 3 to the summator 28 or 29 or 30 for the first point. The sequencer 38 orders the memories 33,34,35 to supply the second argument to each of the summators 28,29 or 30 situated at the first address. Since the projection in question is the first for the set 3, the associated memory 35 is empty and the second argument it provides is zero. The result is fed to each of the memories 33,34,35 at the same address. It is then possible to transfer to the address the following image dot. A new contribution of the projection obtained as depicted in FIG. 2 is supplied by the processor to the image memory. The write process is a real-time process.

It is possible to operate with memory sections of smaller capacity as compared to the maximum capacity of the memory.

At the end of the time t for reconstruction acquisition of an image, each accumulator memory consequently contains a complete image of a stage of the cross-section at a given time. During a period T-t, this memory is no longer addressed by any contribution since its image has been acquired. The first projection to return leaves a free period which may serve the purpose of utilizing the contents of this memory. Upon instructions from the sequencer 38, its read-write memory is then read in such a manner as to be emptied into a mass memory such as a magnetic disc, and/or towards a display device 13.

In particular conditions, the display device may permit a study of the cinematographic kind of the batch of images by using a computer for management of the different images contained in the mass memory. In a delayed time the observer may thus either freeze the display sequence at a particular state or else review the sequence of states at a repitition rate which may for example correspond to retinal persistence.

During all periods T, in which T corresponds to a complete cycle of acquisition, an initialization signal has to be provided to permit a new write operation in each accumulator memory.

I claim:

1. A method for producing in real time a plurality of tomodensitometric images of a planar section of a body being examined by a tomodensitometer having a radiation source, a radiation detector, and a plurality of accumulator memories, each tomodensitometric image having a plurality of picture elements, comprising the steps of:

allocating one accumulator memory to each tomodensitometric image it is desired to observe;

defining an area in each accumulator memory for each picture element of the corresponding tomodensitometric image;

radiating said body with said radiation source a plurality M of times, said radiation source being angularly displaced with respect to said body for successive radiations;

acquiring M projections of radiations passing through said body with said radiation detector, M being greater than a number N minimum projections required to form a tomodensitometric image of said planar section, M and N being positive integers;

calculating, independently for each acquired projection, a contribution each acquired projection makes to each of said plurality of tomodensitometric images, each contribution being allocated to a picture element within each tomodensitometric image to which said contribution is assigned;

entering each calculated contribution into accumulator memory areas corresponding to picture elements to which said contribution is allocated; and producing real time consecutive tomodensitometric images from said plurality of accumulator memories, each accumulator memory corresponding to one tomodensitometric image.

2. A method according to claim 1 wherein said producing step is performed substantially simultaneously with said calculating step and said acquiring step.

3. A method according to claim 1 further including the step of reading out each tomodensitometric image from the corresponding accumulator memory as soon as said tomodensitometric image is produced, and wherein said method is performed repetatively for different planar sections of said body, and wherein each accumulator memory is zeroed as soon as it is read out.

4. Apparatus for producing in real time a plurality of tomodensitometric images of a planar section of a body under examination, each tomodensitometric image including a plurality of picture elements, comprising:

radiating means for radiating said body a plurality M times, said radiating means being angularly displaced with respect to said body for successive radiations;

detector array means for acquiring M projections of radiation passing through said body, M being greater than a number N minimum projections required to form a tomodensitometric image of said planar section, M and N being positive integers;

processing means for calculating, independently for each acquired projection, a contribution each acquired projection makes to each said plurality of tomodensitometric images, each contribution being allocated to a picture element within each tomodensitometric image to which said contribution is assigned;

a plurality of accumulator memory means, one accumulator memory means being allocated to each tomodensitometric image it is desired to observe, each accumulator memory means having an area corresponding to each picture element of the corresponding tomodensitometric image, each accumulator memory means including a read-write memory, an input register, and a summator;

multiplexer means for entering each calculated contribution into accumulator memory areas corresponding to picture elements to which said contribution is allocated;

sequencer means for transmitting to each input register an address of the corresponding read-write memory to which contributions stored in said input register are sent; and programmer means for controlling said sequencer means.

5. Apparatus according to claim 4 further including means for producing real time consecutive tomodensitometric images from said plurality of accumulator memory means, each accumulator memory means corresponding to one tomodensitometric image.

6. Apparatus according to claim 5 further including means for permanently recording contributions stored in said accumulator memory areas as soon as a tomodensitometric image stored in the corresponding accumulator memory means is complete.

* * * * *